(12) United States Patent
Sankabathula et al.

(10) Patent No.: US 7,986,738 B2
(45) Date of Patent: Jul. 26, 2011

(54) PEAK TO AVERAGE POWER RATIO REDUCTION APPARATUS AND METHOD FOR A WIRELESS OFDM TRANSMITTER

(75) Inventors: Dharani Naga Sailaja Sankabathula, Vijayawada (IN); Partha Sarathy Murali, Hyderabad (IN)

(73) Assignee: Redpine Signals, Inc, San Jose, CA (US)

( * ) Notice: Subject to any disclaimer, the term of this patent is extended or adjusted under 35 U.S.C. 154(b) by 949 days.

(21) Appl. No.: 11/874,913

(22) Filed: Oct. 19, 2007

(65) Prior Publication Data

US 2009/0103639 A1  Apr. 23, 2009

(51) Int. Cl.
*H04L 27/28* (2006.01)
(52) U.S. Cl. ........ 375/260; 375/267; 375/295; 375/296; 375/147
(58) Field of Classification Search .................. 375/297, 375/260, 267, 295, 296; 370/203, 204, 208, 370/209, 210
See application file for complete search history.

(56) References Cited

U.S. PATENT DOCUMENTS

| | | | |
|---|---|---|---|
| 6,512,797 B1 | 1/2003 | Tellado et al. | |
| 6,741,661 B2 | 5/2004 | Wheatley et al. | |
| 6,845,082 B2 | 1/2005 | Bourget et al. | |
| 6,853,632 B1 | 2/2005 | Verma et al. | |
| 6,925,128 B2 | 8/2005 | Corral | |
| 6,928,084 B2 | 8/2005 | Cimini et al. | |
| 6,950,389 B2 | 9/2005 | Weerackody | |
| 6,985,533 B2 | 1/2006 | Attallah et al. | |
| 7,058,137 B2 | 6/2006 | Mitlin | |
| 7,313,195 B2 | 12/2007 | Chen et al. | |
| 7,315,580 B2 | 1/2008 | Feng et al. | |
| 7,319,723 B2 | 1/2008 | Jung et al. | |
| 7,340,006 B2 | 3/2008 | Yun et al. | |
| 7,558,328 B2 * | 7/2009 | Mujtaba ........................ 375/260 |
| 7,822,131 B2 * | 10/2010 | Chen et al. ..................... 375/260 |
| 2006/0067415 A1 * | 3/2006 | Mujtaba ........................ 375/260 |

OTHER PUBLICATIONS

Su Hu, Gang Wu, Yong Liang Guan, Choi Look Law, Shaoquian Li "Analyasis of Tone reservation Method for WiMax system", 2006 IEEEE.*

* cited by examiner

*Primary Examiner* — Shuwang Liu
*Assistant Examiner* — Dhaval Patel
(74) *Attorney, Agent, or Firm* — File-EE-Patents.com; Jay A. Chesavage

(57) ABSTRACT

An OFDM symbol comprises information subcarriers which carry the information to be transmitted, accompanied by edge subcarriers, which are selected to minimize the PAPR of the transmitted signal. The selection of edge subcarriers which minimizes PAPR enables either higher power transmission for the same information content, or lower power consumption for the same transmitted symbol power.

18 Claims, 12 Drawing Sheets

IEEE 802.11 OFDM Transmitter
Prior Art

IEEE 802.11 OFDM Spectral Use
Prior Art

Single Subcarrier (PAPR=1)
Frequency Domain
300

64 total subcarriers @ 312.5Khz Intervals

Single Subcarrier
Time Domain
400

A(t) = A*exp(2*pi*k*deltaf*t)
A is the complex constellation point
deltaf is the subcarrier spacing
k is the subcarrier index Subcarriers producing high PAPR
Frequency Domain OFDM symbol in time domain with high PAPR Power Amplifier transfer function Modified edge carriers for reduced PAPR
Frequency Domain 800

Modified edge subcarriers producing reduced PAPR
Time Domain

IEEE 802.11 OFDM Transmitter

OFDM subcarrier amplitude limit mask

Equivalent IFFT

Exhaustive Search Min PAPR modulator

Equivalent to fig 13

Reduced set PAPR search

Reduced set PAPR search

Exemplar symbol S for PAPR reduction edge subcarrier kernal Ki (time domain)

PAPR Reduction Example

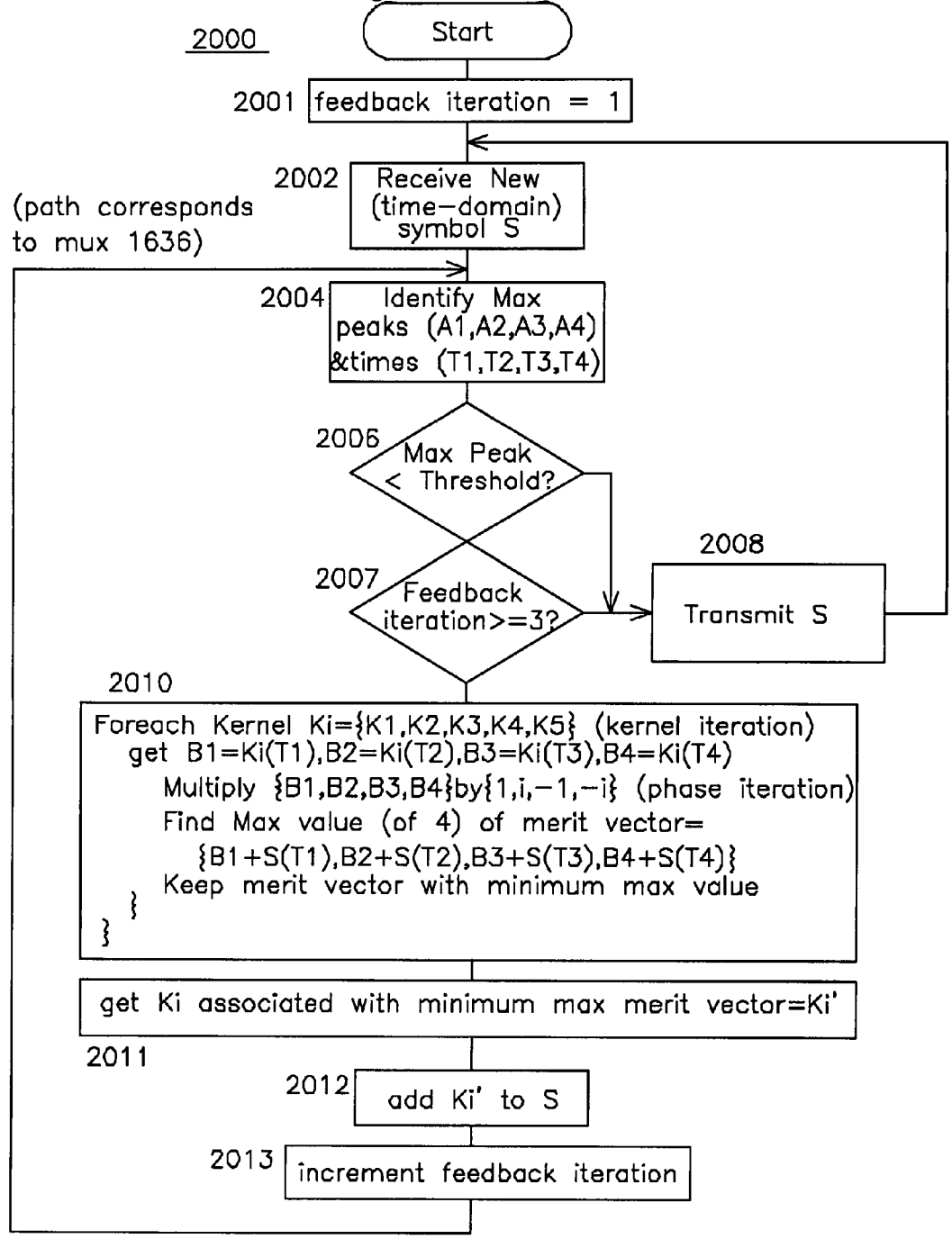

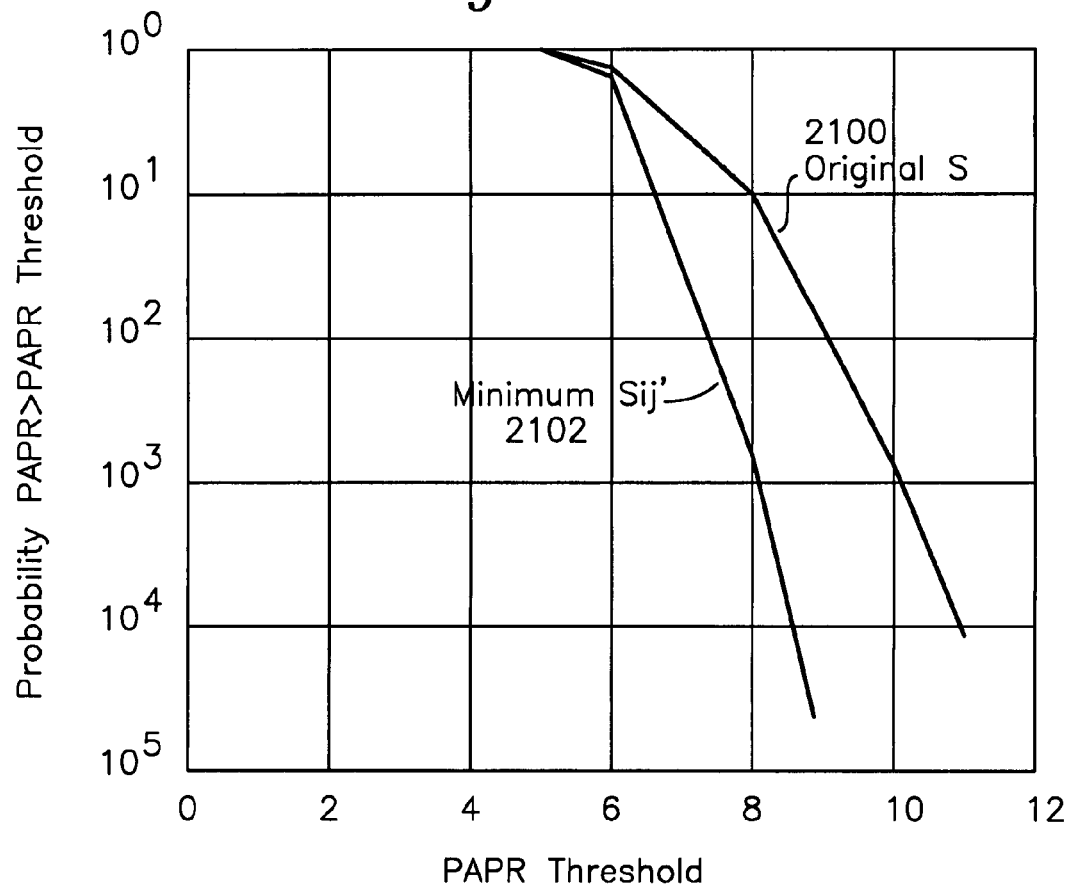

PEAK TO AVERAGE POWER RATIO REDUCTION APPARATUS AND METHOD FOR A WIRELESS OFDM TRANSMITTER

FIELD OF THE INVENTION

The present invention is directed to the field wireless orthogonal frequency division multiplexer (OFDM) transmitters, more particularly the reduction of peak to average power ratio (PAPR) of the transmitted waveforms.

BACKGROUND OF THE INVENTION

FIG. 1 shows a prior art OFDM receiver 100. Digital signals are generated by media access controller MAC 102 and associated circuitry, which generate a stream of digital payload data information for forming the payload a wireless packet. A preamble is pre-pended by function 104 and a packet header including data rate, encoding type, packet length and other information is added by header insertion function 108, and the content is scrambled 112, encoded 116, punctured 118, interleaved 120, and modulated into a plurality of subcarriers 122. An IFFT function 124 converts the complex valued frequency domain modulation information provided by 122 into a complex valued time domain waveform having I and Q components, which is filtered 126, converted to an analog signal 127, and low pass filtered 132 to remove out of band components introduced by the conversion, modulated to a carrier frequency such as 2.4 Ghz by mixer 128 and transmit oscillator 130, and applied to a power amplifier 134, which is coupled to an antenna 136 for transmission through the wireless media.

FIG. 2 shows the 64 OFDM complex subcarriers 200, each of which is generated by an output of the OFDM modulator 122 and provided as an input to the IFFT 124. The OFDM modulator generates 48 data subcarriers which carry the modulated signal, and these complex data subcarriers are accompanied by a DC subcarrier, 4 pilot subcarriers, and 6 null subcarriers below and 5 null subcarriers above the data subcarriers. The pilot subcarriers generate continuous signals for frequency tracking, and the null subcarriers represent subcarrier channels that are unused. The use of these subcarriers is described in the 802.11 series of IEEE wireless Local Area Network (LAN) standards, including specifically 802.11a and 802.11g, all of which are incorporated by reference.

FIG. 3 shows the simple case of a single subcarrier 302 which is represented as having a real and imaginary component, which generate the complex sine waveform 400 with real and imaginary components as shown in FIG. 4, where the waveform generated is $$A(t) = A * \exp(2 * pi * k * \Delta f * t)$$

where A is the complex constellation point,
$\Delta f$ is the subcarrier spacing,
and k is the subcarrier index.

FIG. 5 shows the frequency domain representation of an OFDM symbol 500, and FIG. 6 shows the time domain representation 600 of the amplitude of the same symbol. A problem arises in an OFDM transmission system whereby the OFDM symbol stream may produce time-domain signals with an unusually high Peak to Average Power Ratio (PAPR), as shown in the peaks 602 and 604 of FIG. 6. The gain of the power amplifier 134 of FIG. 1 is linear over a signal range as shown in the transfer function 706 of FIG. 7. An input signal 704 generates an amplified output signal 702 until a critical input amplitude 708 is reached, where the curve 706 flattens out because of saturation and other non-linearities in the amplifier. When the input signal exceeds threshold 708, the output response is no longer linear, and inter-modulation cross products are generated by the power amplifier which distort the time and frequency domain representations of the desired symbol, and these distortion generate errors at a receiver which attempts to demodulate the nonlinear subcarriers. In order to avoid the saturation and non-linear operation of the power amplifier 134, the overall signal amplitude is scaled by a factor which allows for peaks 602 and 604 to remain below the linear operation threshold 708 of the power amplifier.

U.S. Pat. Nos. 6,512,797, 6,512,797, 6,853,632 and 6,928,084 describe PAPR reduction systems whereby the information subcarriers are modified to reduce PAPR.

U.S. Pat. No. 6,741,661 describes a PAPR reduction system for CDMA2000 cellular telephone applications whereby the information subcarriers are modified using a raised cosine function.

U.S. Pat. No. 6,950,389 describes a PAPR reduction system using differential phase encoding of the signal to be transmitted.

U.S. Pat. No. 6,985,533 describes a PAPR reduction system using transforms at the transmitter and receiver which cause the transmitted signal to have a reduced PAPR.

OBJECTS OF THE INVENTION

A first object of the invention is the use of edge subcarriers to minimize the PAPR of a transmitted OFDM symbol.

A second object of the invention is an apparatus which evaluates a set of edge subcarrier kernel functions to add to a symbol, selecting one to minimize the PAPR of the sum of the symbol and the selected subcarrier kernel.

A third object of the invention is an apparatus which iteratively evaluates a set of edge subcarrier kernel functions for a given symbol, selecting a kernel which minimizes the PAPR of the sum of the selected kernel and the symbol, and iteratively searches for a new kernel using the previous sum as the initial symbol.

a fourth object of the invention is the use of standards-compliant 802.11a or 802.11g OFDM subcarriers −27, −28, 27, and 28, and optionally −29, to reduce PAPR in an OFDM symbol and maintain the carrier amplitude mask requirements.

SUMMARY OF THE INVENTION

An OFDM symbol comprising information subcarriers and optionally pilot subcarriers is input to a signal processor. The signal processor adds linear combinations of subcarriers formed from unused null subcarriers orthogonal to the information subcarriers and pilot subcarriers as follows:

1) For symbol S, note the four maximum amplitudes A1, A2, A3, A4 and corresponding times of these maximums T1, T2, T3, T4, respectively.

2) In an iteration loop i, for each of 5 reduction time domain kernels Ki formed from the previously unused null subcarriers:

3) For each of the phase rotations $\phi$ {1, j, −1, −j}, multiply the reduction kernel Ki by a phase rotation $\phi$, using only the 4 kernel points {Ki(T1), Ki(T2), Ki(T3), Ki(T4)}, and sum these with the corresponding symbol values {S(T1), S(T2), S(T3), S(T4)}, thereby forming a figure of merit vector. Each figure of merit vector is thereby formed as {S(T1)+(Ki(T1), S(T2)+Ki(T2), S(T3)+Ki(T3), S(T4)+Ki(T4)}$\phi$. The maximum merit vector is defined as the merit vector having the largest peak value, associated with each merit vector is Tn, Ki, and phase rotation ϕ associated with this vector.

4) For the set of merit vectors formed by the 5 Ki kernels of kernel iteration step 2 combined with phase iteration and maximum merit vector selection of step 3, select a single merit vector having the minimum maximum amplitude from among the largest peak values, including Tn, Ki, and phase rotation ϕ associated with this vector.

5) Using all values of the selected kernel Ki from step 4, delayed by Tn selected from step 4 and rotated by the phase selected from step 3, add this optimized reduction kernel to the current symbol, thereby forming a new symbol S comprising the original information subcarriers and the selected reduction kernel.

6) Repeat steps 1 through 5, forming a new symbol S on each iteration until either the PAPR is acceptable, or a maximum iteration count has been reached.

In one embodiment of the above process, each kernel Ki is formed from OFDM subcarriers −27, −28, 27, and 28, and optionally −29.

BRIEF DESCRIPTION OF THE DRAWINGS

FIG. 20 shows a process flow for PAPR reduction.

FIG. 21 shows a PAPR reduction graph.

DETAILED DESCRIPTION OF THE INVENTION

Figure 5:
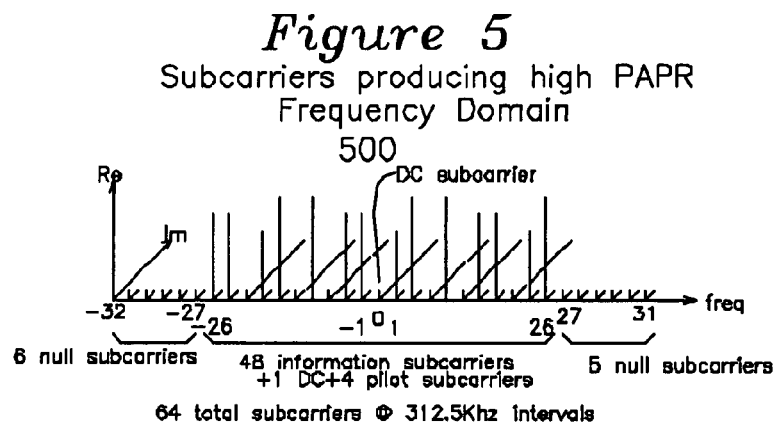
FIG. 5 shows the frequency domain representation for an OFDM symbol having a high peak to average power ratio.
Figure 6:
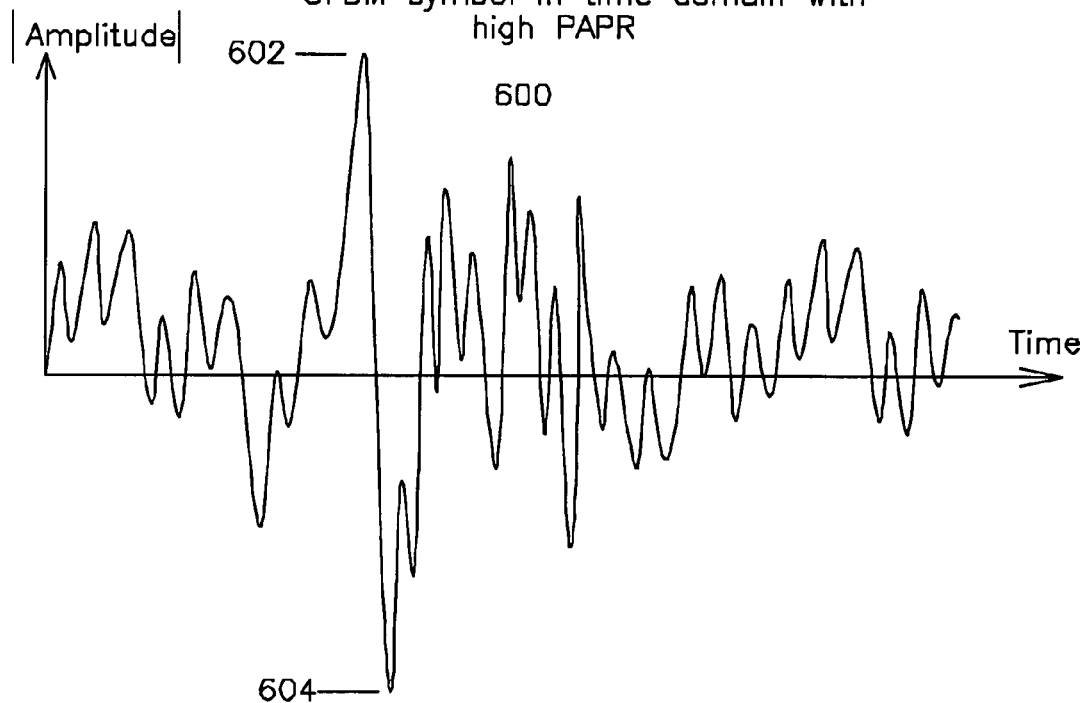
FIG. 6 shows the time domain representation for the OFDM symbol of FIG. 5.
Figure 7:
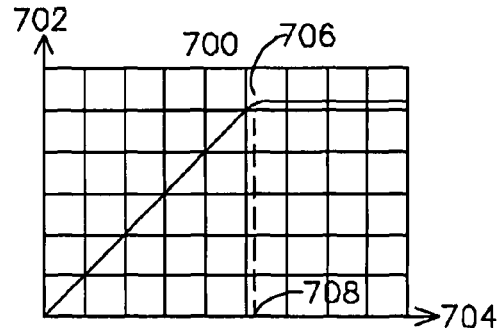
FIG. 7 shows the transfer function for a power amplifier.

FIG. 5 shows a prior art OFDM symbol with associated time domain waveform 600 of FIG. 6. As was described earlier, the symbol 500 of FIG. 5 comprises a plurality of information subcarriers and a plurality of pilot subcarriers, accompanied by null, or empty, subcarriers. Because the OFDM symbols are generated according to a standardized set of algorithms such as those described in the 802.11 wireless LAN standards, it is not possible to modify the information or pilot subcarriers of these symbols while maintaining interoperability associated with compliance to those standards. However, as the edge subcarriers are not part of the information subcarriers of the OFDM symbol, it is possible to modify these subcarriers to minimize the PAPR of the transmitted symbol, particularly using subcarriers −27, −28, 27, and 28, and optionally −29.

Figure 8:
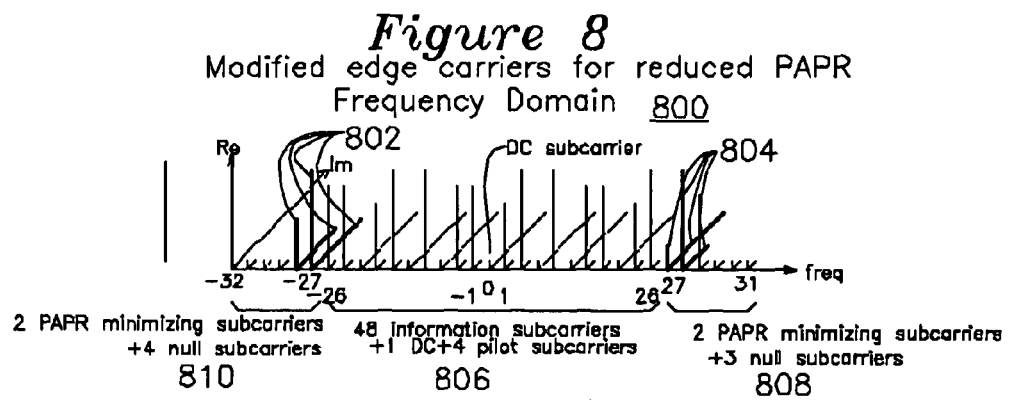
FIG. 8 shows the modified edge subcarriers of the present invention.
Figure 9:
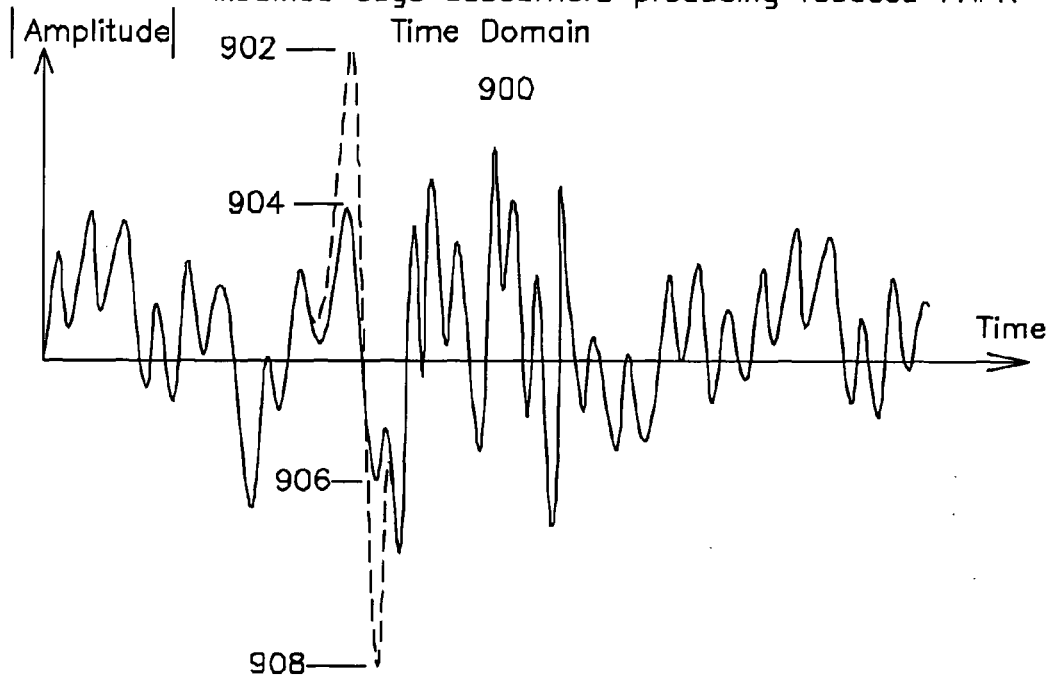
FIG. 9 shows the time domain representation for the symbol of FIG. 8.

FIG. 8 shows symbol 800 which has been derived from symbol 500 of FIG. 5, where the information and pilot subcarriers 806 of FIG. 8 are identical to the information subcarriers 502 of FIG. 5. FIG. 8, however, has edge subcarriers 802 and edge subcarriers 804 which are null (empty) subcarriers in FIG. 5, and these subcarriers are selected to minimize the PAPR of the resulting time domain waveform shown in FIG. 9 where the reduction of peaks 902 and 908 of the original waveform with the added subcarriers result in reduced peaks 904 and 906 of the modified waveform. FIG. 9 is a simplification of the effect of PAPR reduction, as it is clear to one skilled in the art that adding subcarriers would generally change the entire time-domain waveform 900, rather than simply reduce the illustrative peaks as shown in the figure.

Figure 1:
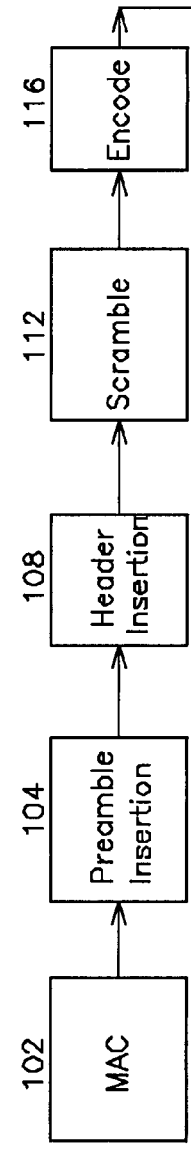
FIG. 1 shows the block diagram for a prior art OFDM transmitter.
Figure 2:
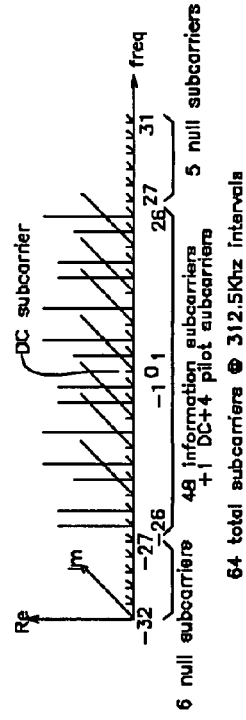
FIG. 2 shows the frequency domain composition of a prior art OFDM symbol.
Figure 3:
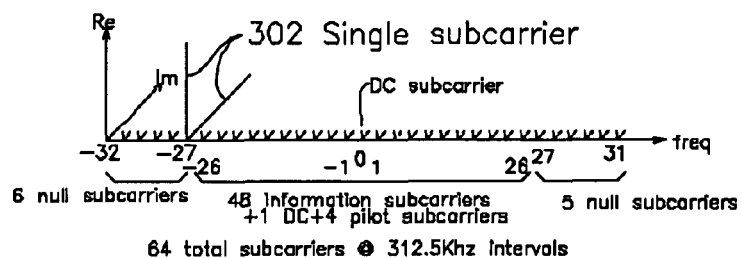
FIG. 3 shows a simple example for the frequency domain representation for a single subcarrier.
Figure 4:
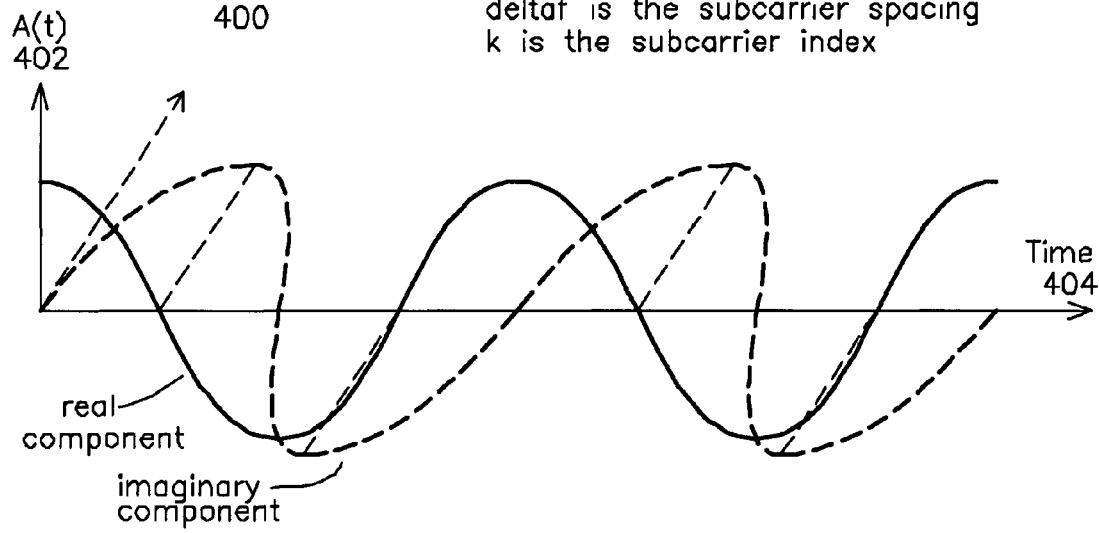
FIG. 4 shows the time domain representation for the carrier of FIG. 3.
Figure 10:
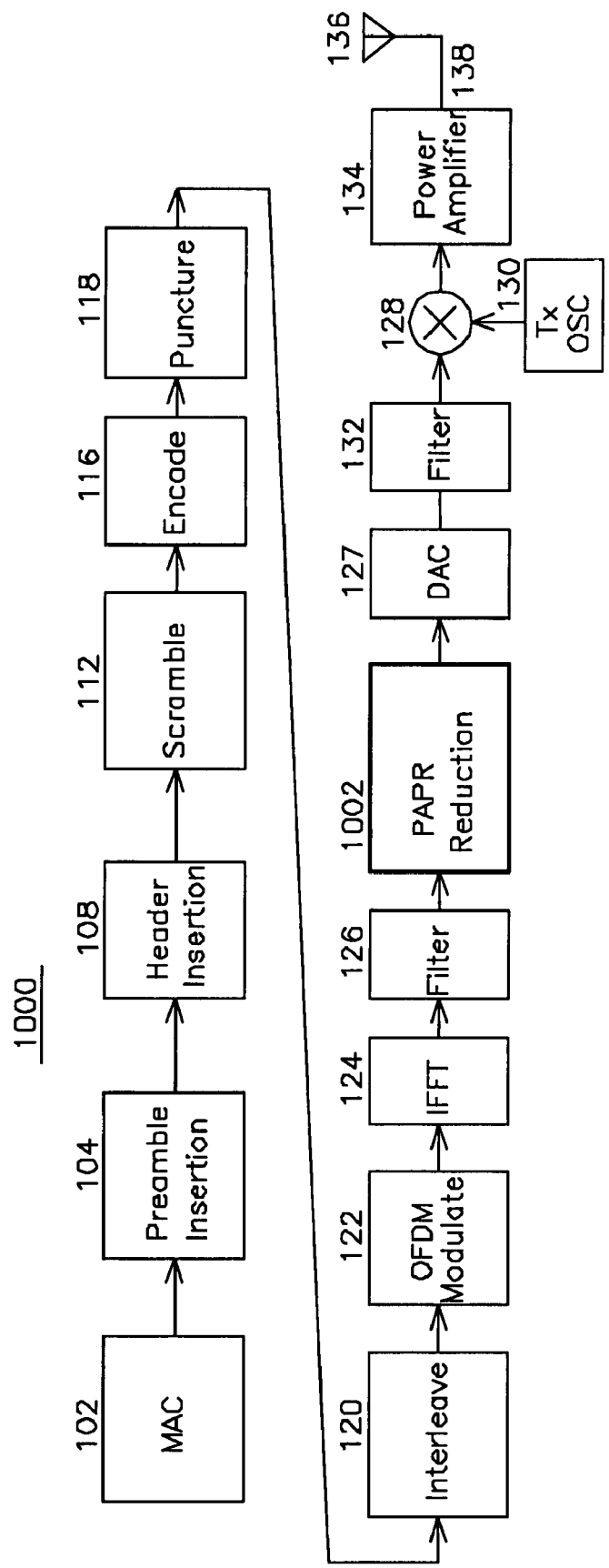
FIG. 10 shows the block diagram for a reduced PAPR OFDM transmitter according to the present invention.
Figure 11:
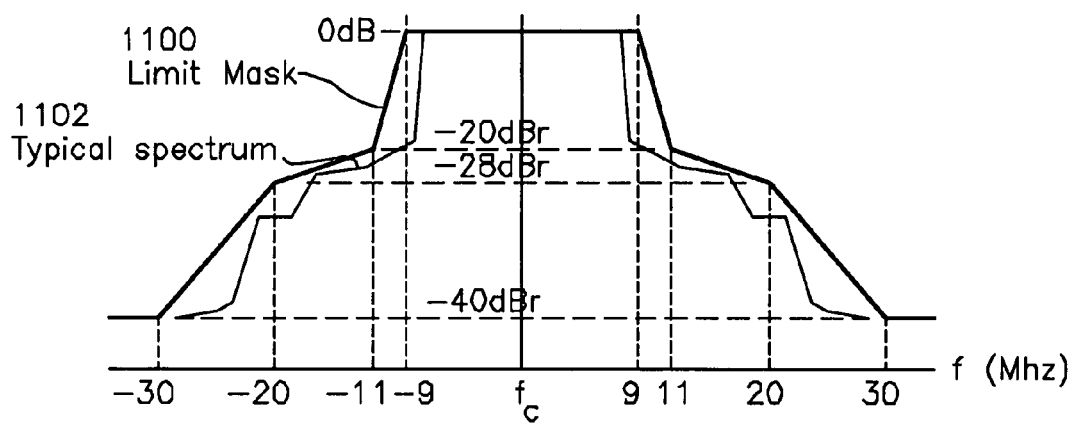
FIG. 11 shows the OFDM subcarrier amplitude limit mask.

FIG. 10 shows the OFDM transmitter from FIG. 1 with a PAPR correction function 1002 added after the filter 126 and before DAC 127. Unfortunately, there is not an analytic formula or algorithm which directly provides the best set of edge subcarriers for a given set of required information subcarriers which produces minimum PAPR for the combined set of subcarriers. Rather, it is necessary to perform a search among the various combinations of available edge subcarriers to find the subcarrier combination which results in the greatest reduction of PAPR. As an additional constraint, the subcarriers added are subject to the subcarrier amplitude limit mask 1100 shown in FIG. 11 which constrains the maximum amplitude of the various subcarriers, including the information, pilot, and edge subcarriers of the present invention.

Figure 12:
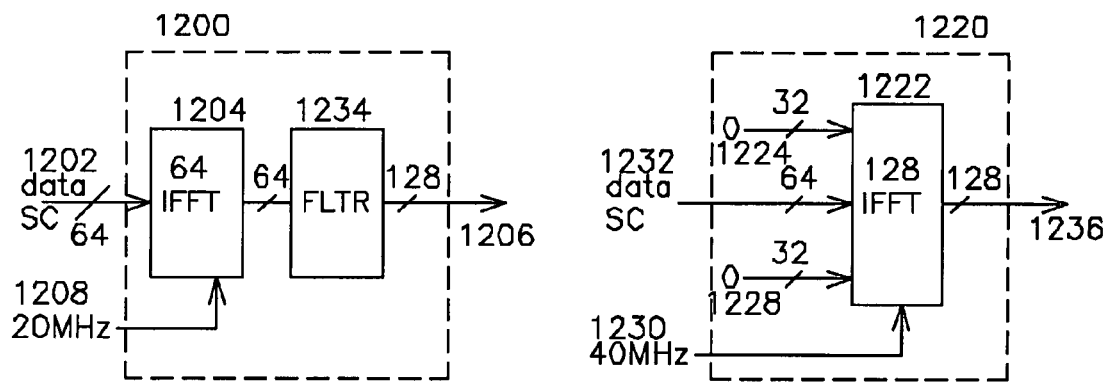
FIG. 12 shows the block diagram for equivalent IFFTs, one IFFT having n inputs at sampling rate f, and the other IFFT with an additional n 0-valued inputs operating at a sampling rate of 2 f.

FIG. 12 shows equivalence between two IFFT functions 1200 and 1220. Function 1200 includes 64 complex valued IFFT 1204, which is clocked at a rate of 20 Mhz, generating a 64 complex value time domain vector which is expanded to 128 points by filter 1234 to form output 1206. IFFT function 1220 performs the equivalent function by performing a 128 complex value IFFT 1222, where the input 1232 is still a 64 valued complex input as was input 1202 of IFFT 1200, but the surrounding 32 inputs on either side 1224 and 1228 are null inputs. The output of IFFT 1222 is a 128 valued output which is clocked at 40 Mhz 1230, double the rate of equivalent 64 IFFT function 1200 rate 1208.

Figure 13:
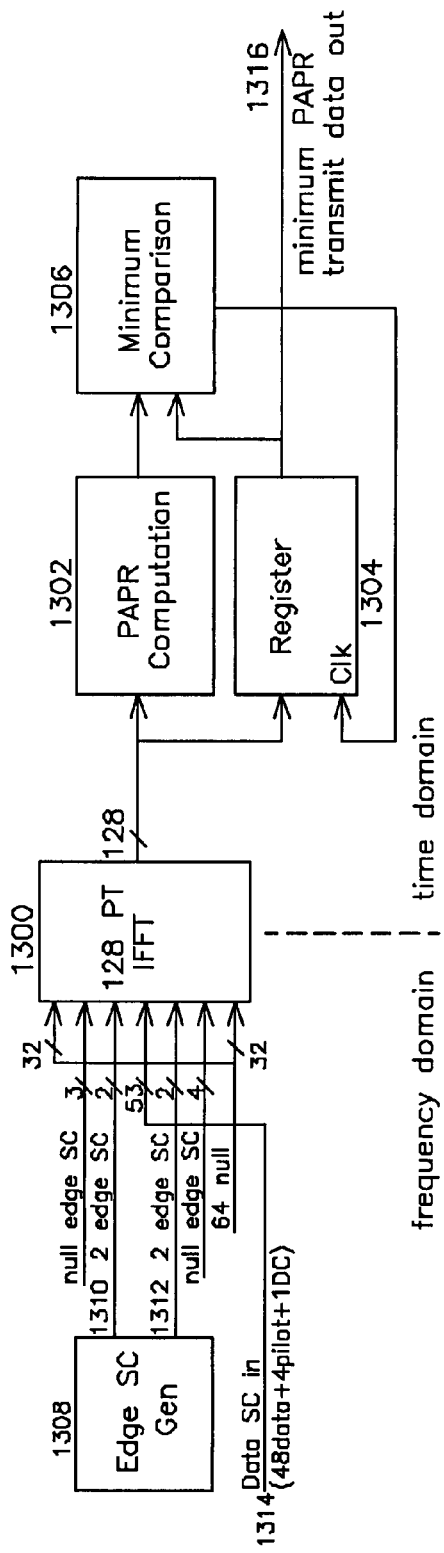
FIG. 13 shows the block diagram for an exhaustive search minimum PAPR modulator.

FIG. 13 shows an exhaustive search minimum PAPR modulator. The information subcarriers 1314 are input to a 128 point IFFT 1300 as was described for FIG. 12. The 128 point IFFT 1300 is preferred over the 64 point IFFT (1200 of FIG. 12) for the PAPR application because the improved IFFT resolution reduces the effect of small nonlinearities that may be introduced. In the exhaustive search PAPR modulator of FIG. 13, the information subcarriers are input 1314 along with the candidate edge subcarriers 1310 and 1312 generated by edge subcarrier generator 1308, which may select the candidate edge subcarriers using any algorithm including exhaustive search. The 128 point IFFT 1300 converts the values to a time domain vector representing the successive values to transmit, and a PAPR calculation 1302 is performed on the resulting time domain IFFT output, and this value is stored 1304 if it generates a new minimum PAPR, and if necessary, a new set of subcarriers are generated 1308 and tested for minimum PAPR until an acceptable time-domain symbol, formed from frequency domain original information subcarriers and new edge subcarriers, is found. The minimum set of reduced PAPR information subcarriers and edge subcarriers is thereby determined and output as the new time domain output waveform 1316 for amplification and transmission, as before. By carefully selecting a set of edge subcarriers 1310 and 1312 which conform to the subcarrier limit mask 1100 of FIG. 11, and adding these subcarriers to the unmodified information subcarriers 1314, it is possible to reduce the PAPR of the transmitted signal. This reduction in PAPR in the corrected signal is on the order of a few dB, which may be translated into reduced power consumption by transmitting the corrected signal at a slightly lower power amplifier gain, or an increased power output by feeding a slightly larger amplitude signal to the power amplifier. Improvements of up to 2 db may be accomplished in this manner, which corresponds to an increase of the output power, or in an increase of the distance from the transmitter to the receiver for the same SINR.

Figure 14:
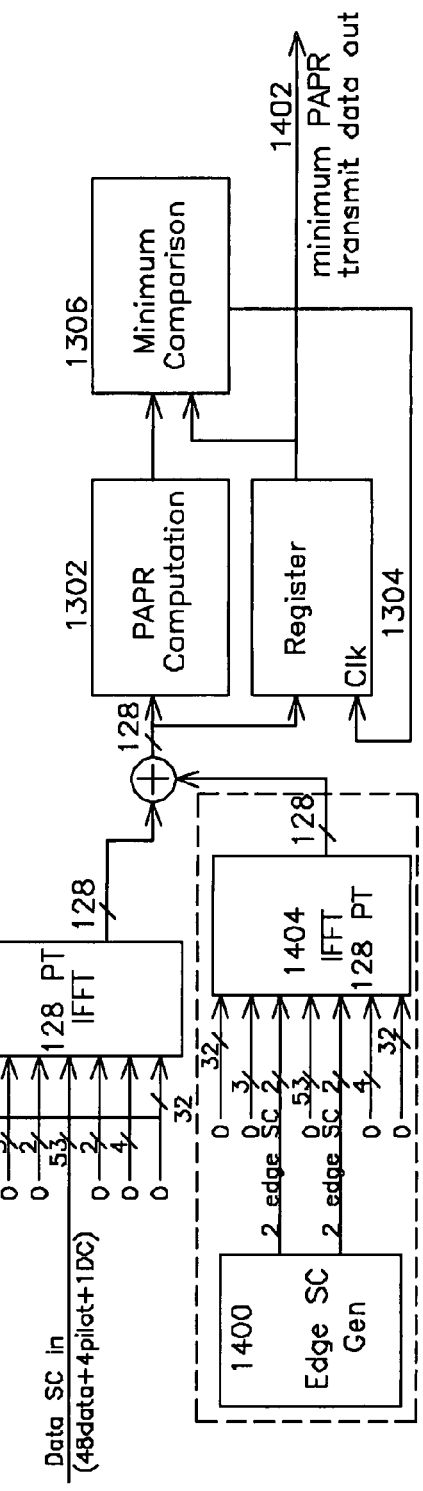
FIG. 14 shows the block diagram for a further reduction equivalent to FIG. 13.

FIG. 14 shows a minimum PAPR processing function equivalent to FIG. 13, and since the inverse FFT is a linear operation, data and edge subcarriers can be separated out, with the outputs of data subcarrier IFFT 1300 and edge subcarrier IFFT 1404 summed in the time domain to achieve the same result as FIG. 13 to produce a minimum PAPR time domain transmit output 1402. One of the problems of sequentially performing an exhaustive search of all possible edge subcarriers is the amount of time such an exhaustive search would take greatly exceeds the symbol time during which it needs to be conducted before the next symbol arrives, due to the large number of subcarriers, amplitudes, and phase combinations.

Figure 15:
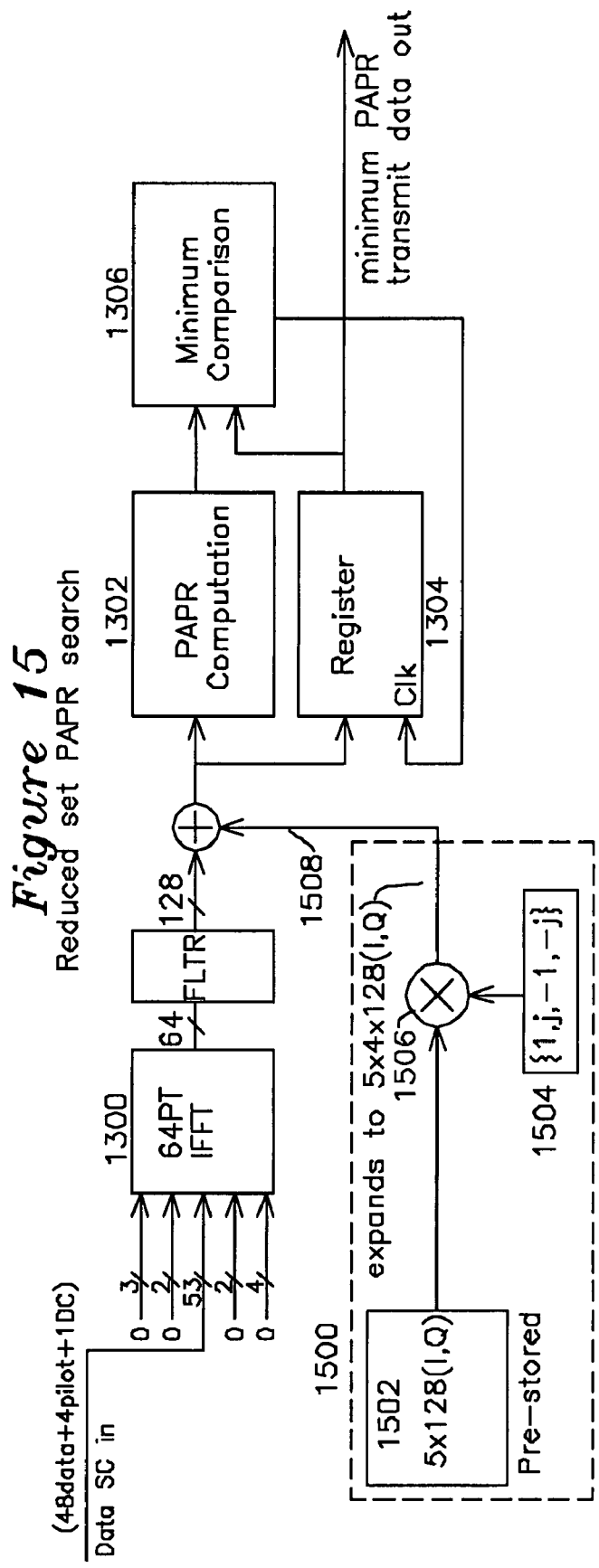
FIG. 15 shows the block diagram for a reduced set PAPR search.

It has been discovered that out of the many possible edge subcarrier combinations, only a small subset of these are suitable as kernels for additive PAPR reduction, as many of the candidates have equivalent reductions as the subset, and other candidates have no effect in reduction of PAPR. FIG. 15 shows a reduced set PAPR search similar to that of FIG. 14 and FIG. 13, which the identical reference numerals used for functions performed as in FIG. 13. A time domain PAPR search function 1500 includes memory 1502 which pre-stores 5 time domain edge subcarrier combinations representing a reduced set of 5 prospective kernels stored as 128 point time-domain representations, which eliminates the IFFT 1404 of FIG. 14. The reduced set of edge subcarriers is selected based on having a peak amplitude node which can be used to cancel a time domain data subcarrier peak. The 5 PAPR kernels which have this peak amplitude characteristic are stored in time domain memory 1502 and are time-delayed for the particular incoming data symbol S to cancel the desired peaks of the incoming data symbol S, and multiplied 1506 by a one of the phase rotation values from the set $\{1, j, -1, -j\}$ 1504 to generate output 1508 for PAPR reduction. In this manner, a reduced set of time-domain subcarriers can be added to the data subcarriers to reduce the PAPR of the transmitted symbol. While this is a considerable improvement over the exhaustive search of FIGS. 12-14, it still consumes more time than is available in a single symbol S interval.

Figure 16:
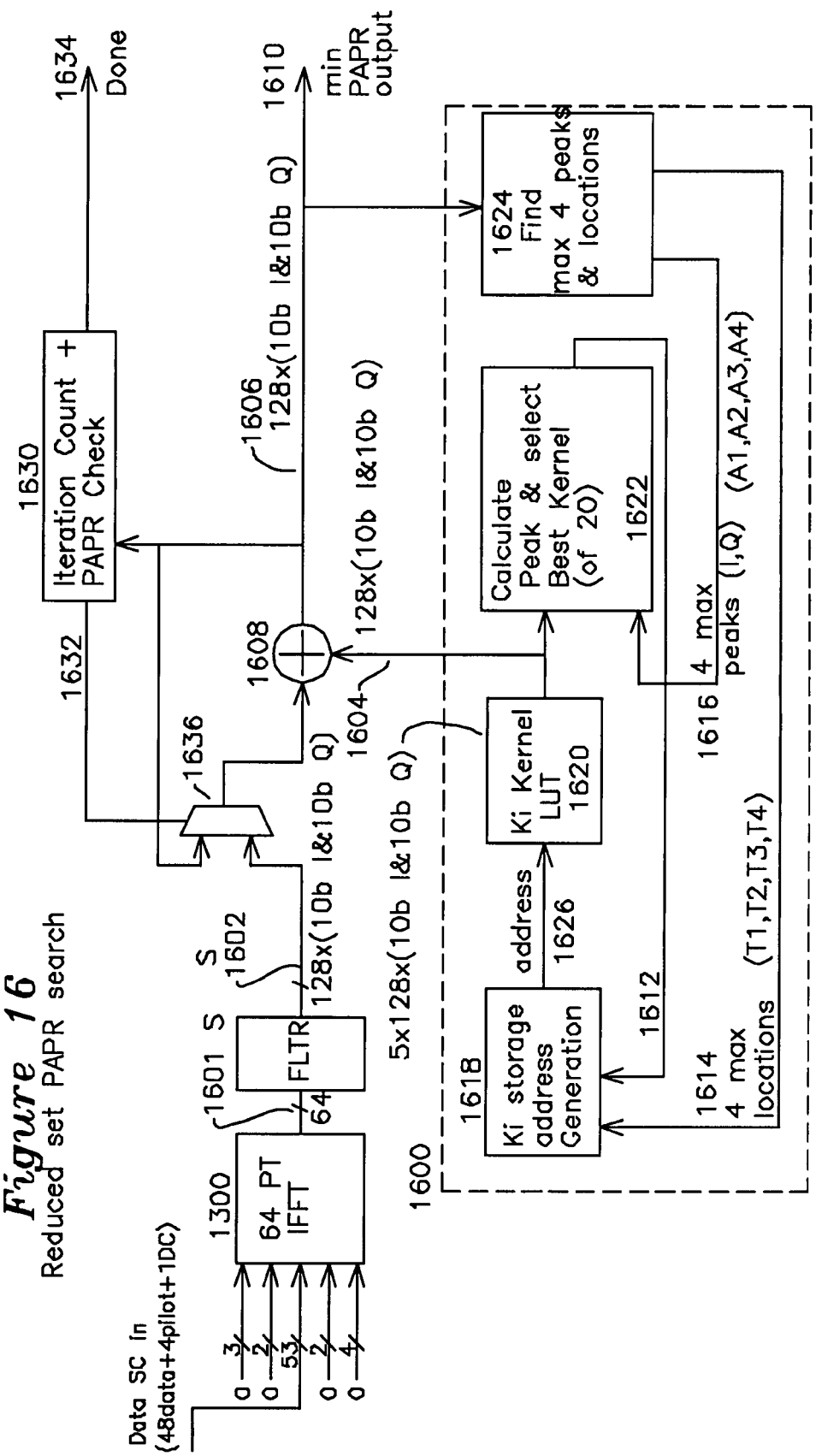
FIG. 16 shows the block diagram for a reduced search PAPR search of the present invention.

FIG. 16 shows the PAPR reducing subcarrier selection function 1600 of the present invention. As before, data subcarriers are converted to the time domain by IFFT 1300, shown as a 64 point IFFT expanding to 128 points. In the best mode of the invention, symbols S 1601 enter comprising 64 sequential time bins, each having a resolution of 10 bits of I data and 10 bits of Q data, and are expanded to a vector of 128 points 1602 S. In the first iteration, multiplexer 1636 selects original symbol 1602, whereas in subsequent iterations an improved symbol 1606 is selected, as will be described. After computation of a reduced PAPR edge subcarrier in processor 1600, the time domain edge subcarrier combination 1604 will be added 1608 to generate a minimum PAPR output 1610.

Figure 17:
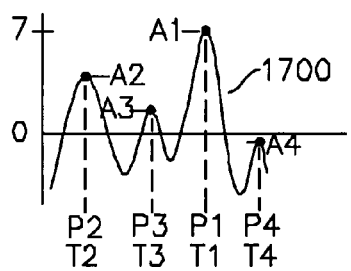
FIG. 17 shows the waveform for a symbol S.
Figure 18:
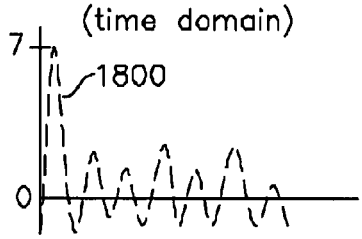
FIG. 18 shows the waveform for an edge subcarrier kernel Ki.
Figure 19:
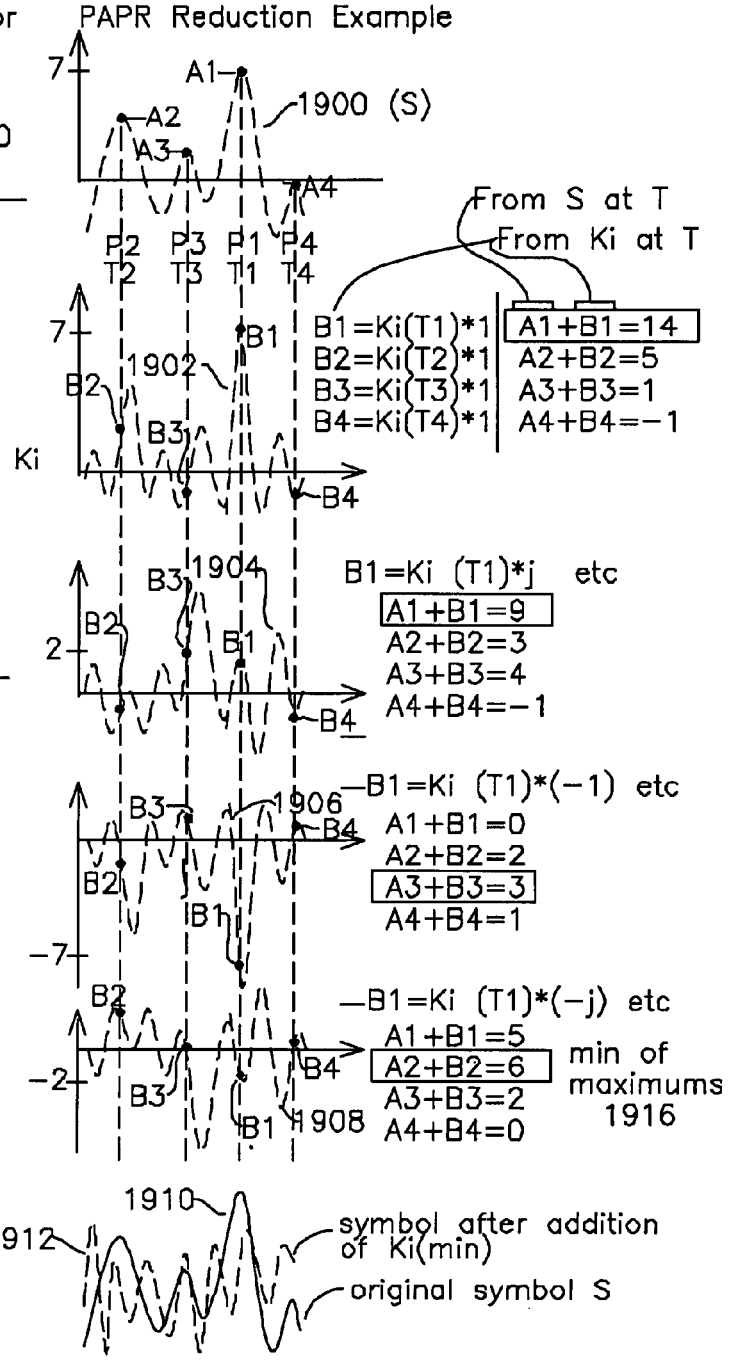
FIG. 19 shows the operation of 4 merit vectors including selection of a minimum merit vector.

The details of operation of the minimum PAPR subcarrier function 1600 are best understood in combination with symbol S waveform of FIG. 17, and kernel edge subcarrier Ki of FIG. 18, shown as an amplitude waveform, although both S and Ki are actually analytic with I and Q components. Ki 1800 is an example of a subcarrier combination chosen as a kernel Ki because of the production of a single peak, with subsequent peaks shown for time reference. Kernel look up table (LUT) 1620 stores a plurality such as 5 of edge subcarrier kernels, with the peak for each kernel set to the time origin 0. For example, kernel Ki 1800 may have been derived from a subcarrier combination which produced a time-domain peak in the middle, but the waveform is circularly rotated forward or backwards as required to place the peak A at the origin, so that all kernels may be addressed with reference to the initial peak. When a symbol S arrives on input 1602, a 0 is added in 1604 so that the unchanged symbol S is presented to the input of peak and location finder 1624, which generates an output 1614 showing only the 4 peak amplitude locations in order from largest to smallest amplitude A1, A2, A3, A4, corresponding to T1, T2, T3, and T4, as can be seen in symbol S waveform 1700. The storage address generation 1618 uses the 4 max peak offsets T1, T2, T3, T4 of the current symbol S 1602 to address the kernel Ki and return the 4 associated kernel amplitude values B1, B2, B3, B4, associated with kernel Ki at times T1, T2, T3, T4, as shown in FIG. 19, waveform 1902. Subsequent waveforms 1904, 1906, 1908 represent the same kernel phase rotated by multiplying by $\{1, j, -1, -j\}$, each phase rotation generating a new set of A1+B1, etc values. From a single kernel phase rotation such as 1902, the four resulting values are examined to find the maximum value in the set, known as a merit vector and shown as the value 14 for 1902 corresponding to phase multiplication of 1, value 9 for 1904 corresponding to phase multiplication of j, value 3 for 1906 corresponding to phase multiplication of −1, and value 6 for 1908 corresponding to phase multiplication of −j. The levels of iteration are a kernel iteration corresponding to which of the 5 kernels is used, and a phase iteration corresponding to which of the 4 phases the selected kernel is multiplied by. Each of the 5 kernels iterations and 4 phase rotation iterations generates a merit vector comprising A1+B1, A2+B2, A3+B3, A4+B4 as shown in FIG. 19, each of which is chosen for a maximum value, known as the merit vector maximum value. Over all iterations, the minimum of the set of merit vector maximum value is chosen. Conceptually, the maximum component of each merit vector represents the maximum value that would be expected from the addition of the symbol S with this vector, and the minimum merit vector from the 20 such combinations of kernels and phases represents the best candidate for adding to the incoming symbol to reduce the PAPR. Once selected, the selected Ki delayed by T1 and multiplied by the selected phase is added as a new output 1610 of FIG. 16, and the iteration count and PAPR are checked in function 1630, which also selects the new symbol input to mux 1636 for subsequent iterations. The modified symbol is checked by function 1630 to determine whether it satisfies the PAPR criteria, and if so, it is output 1610 as the final value with DONE indicator 1634. If it does not satisfy the PAPR criteria and the maximum iteration count has not been reached, this 128 value symbol 1606 becomes the new input symbol S, and is input to max peak finder 1624, which generates a new set of 4 max peak A1, A2, A3, and A4 with corresponding time positions T1, T2, T3, T4, and the process continues as described earlier with the new symbol S. A limit of feedback iterations for each new symbol S after addition of Ki may be imposed, such that the maximum number of times Ki associated with the best merit vector may be added to S could be set to 3 feedback iterations.

Waveform 1910 shows the original symbol S, and waveform 1912 shows the result of successive additions of delayed, phase rotated kernels Ki. As described earlier, the addition of edge vectors results in a reduced PAPR of waveform 1912, while maintaining the same information subcarriers.

FIG. 20 shows the operation of the PAPR as a process 2000. The feedback iteration variable is initialized 2001, a new time-domain symbol S is received 2002, as from the output of an IFFT as described earlier, and the max peaks (A1, A2, A3, A4) ordered by magnitude where A1 is the maximum and associated time locations (T1, T2, T3, T4) are identified 2004. If the max peak of the symbol or alternatively the PAPR of the symbol is below a threshold in step 2006, the symbol is transmitted without modification in step 2008. If the max peak exceeds a threshold, a PAPR minimization 2010 is performed. The minimization process 2010 includes the kernel iteration loop where each kernel Ki is selected, shown in the best mode as 5 kernels K1 through K5. Each of the kernel values Ki(T1), Ki(T2), Ki(T3), and Ki(T4) is phase rotated in a phase iteration, and each of the 4 values is added to the associated symbol value S(T1), S(T2), S(T3), S(T4) to generate a merit vector. The merit vector has 4 values, and the merit vector with the smallest maximum value is chosen through the kernel and phase iterations. After the kernel iteration and phase iteration loop are complete, the kernel associated with the minimum max merit vector is read from the kernel memory with all 128 values in step 2011 and shown as Ki', which is added to S in step 2012, and the increment feedback iteration variable is incremented in 2013. The process returns to step 2004 with the new symbol S which has the previous Ki' added, and the process starts anew with the new S. As before, if the max peak is less than a threshold value 2006, the process terminates as completed and transmits the symbol S, which also occurs if the number of feedback iterations is exceeded 2007. The selection of threshold to retain a symbol as having acceptable PAPR is shown in FIG. 21. The y axis represents the probability of having a PAPR which exceeds a given PAPR threshold shown in the x axis. Curve 2100 shows an original symbol with a probability of exceeding the PAPR threshold as shown, and the reduced PAPR symbol is shown in curve 2102.

We claim:

1. A process for generating a reduced peak to average power ratio (PAPR) symbol for a communications system using a first plurality of subcarriers which are information subcarriers and a second plurality of subcarriers which are not information subcarriers, where said first plurality of subcarriers and said second plurality of subcarriers are subject to frequency domain magnitude limitations, the process comprising:
   a transmitter computing the peak to average power ratio (PAPR) for said first plurality of subcarriers, and when said PAPR is above a particular threshold, performing:
   a first step of forming a limited list of peak amplitudes and associated offset time for each said peak amplitude, said limited list containing the largest peak amplitudes;
   a second step of forming candidates, each said candidate generated by using a fixed set of kernels which use only said second plurality of subcarriers, expanding each one of the fixed set of kernels by multiplication with $\{1, j, -1, -j\}$, and time shifting each said expanded kernel by a time offset corresponding to one of said peak amplitude time offsets;
   a third step of computing the peak to average power ratio for a superposition of said symbol and one or more of said candidates and repeating said third step until said PAPR is below a threshold or until an iteration count is reached;
   a fourth step of selecting said third step superposition of said symbol and one or more of said candidates to form said reduced PAPR symbol.

2. The process of claim 1 where said first plurality of subcarriers includes 48 information subcarriers, a pilot subcarrier, and 4 edge subcarriers.

3. The process of claim 1 where said second plurality of subcarriers includes 11 subcarriers.

4. The process of claim 1 where said second plurality of subcarriers includes at least subcarriers −27, −28, 27, and 28.

5. A process for selecting reduced peak to average power ratio subcarriers for a symbol S comprising a plurality of information subcarriers, the process having the steps:
   in a transmitter, a first step of identifying maximum time-domain peaks of said symbol and the times at which each said maximum time-domain peak occurs, optionally also measuring the peak to average power ratio of said symbol S;
   a second step of comparing said maximum time-domain peak or alternatively with said peak to average power ratio of said symbol S with a threshold and also with a maximum iteration count, transmitting said symbol if said maximum time-domain peak is below said threshold or above said maximum iteration count and processing further otherwise;
   a third step of kernel iteration whereby a correction kernel Ki is selected and a kernel iteration plurality of values Ki(T) is selected from said correction kernel, said plurality of values substantially comprising the correction kernel value at each said first step times;
   a fourth step of phase iteration whereby each third step kernel Ki(T) is multiplied by a phase rotation value, thereby forming Ki(T)';
   a fifth step of adding each said Ki(T)' to said S for each said phase iteration and each said kernel iteration, thereby forming a merit vector, said merit vector with a maximum value being said maximum merit vector;
   a sixth step of selecting a minimum value from said maximum merit vectors having the minimum value from among said maximum merit vectors;
   an seventh step of adding all values of corresponding said kernel Ki(T)' to said symbol S and incrementing said feedback iteration, thereafter executing said first step.

6. The process of claim 5 whereby said maximum feedback iteration count is one of 1, 2, or 3.

7. The process of claim 5 whereby said number of kernel Ki is 5.

8. The process of claim 5 whereby said phase iterations are multiplication of said kernel Ki by $\{1, j, -1, -j\}$.

9. The process of claim 5 whereby said maximum time-domain peaks is the maximum 4 said peaks.

10. The process of claim 5 where said first step identifying maximum time-domain peaks includes ordering said time-domain peaks and associated offset time by the value of each maximum said peak.

11. The process of claim 5 where a set of merit vectors is formed from {Ki(T1)+S(T1), Ki(T2)+S(T2), Ki(T3)+S(T3), Ki(T4)+S(T4)}*(said iteration phase), said maximum merit vector being the one having the maximum value in the set elements {Ki(T1)+S(T1), Ki(T2)+S(T2), Ki(T3)+S(T3), Ki(T4)+S(T4)}*(said iteration phase) where:

Ki is a said correction kernel;

T1, T2, T3, T4 are the time positions of said symbol maximum amplitudes;

Ki(T1), Ki(T2), Ki(T3), Ki(T4) are the amplitude values of said correction kernel at said T1, said T2, said T3, and said T4;

said iteration phase is each of $\{1, j, -1, -j\}$;

said Ki(T)' being the kernel corresponding to the kernel having the minimum said maximum merit vector.

12. The process of claim 5 where each said fifth step merit vector has a merit vector maximum value which is formed from the maximum magnitude of said merit vector {Ki(T1)+S(T1), Ki(T2)+S(T2), Ki(T3)+S(T3), Ki(T4)+S(T4)}, said minimum maximum merit vector is the merit vector associated with said merit vector having the minimum said merit vector maximum value.

13. The process of claim 1 where said third step symbol superposition is the addition of said symbol and each said candidate which results in a reduced computed PAPR.

14. The process of claim 1 where each said third step candidate has a time offset corresponding to at least one of said first step peak amplitude time offsets.

15. The process of claim 1 where said third step symbol is the addition of a previous third step symbol and a previous third step candidate.

16. The process of claim 1 where said fixed set of kernels is 5 kernels.

17. The process of claim 1 where said second plurality of subcarriers are null subcarriers.

18. The process of claim 1 where said second plurality of subcarriers are selected to produce an amplitude maximum which may be time offset and phase shifted through multiplication by $\{1, j, -1, -j\}$ to reduce a symbol amplitude maximum.

* * * * *